United States Patent

[11] 3,628,096

| [72] | Inventors | Thomas C. Drew, Jr.;<br>Norbert B. Watts, Jr., both of Raleigh, N.C. |
|---|---|---|
| [21] | Appl. No. | 1,589 |
| [22] | Filed | Jan. 9, 1970 |
| [45] | Patented | Dec. 14, 1971 |
| [73] | Assignee | Westinghouse Electric Corporation<br>Pittsburgh, Pa. |

[54] METER ASSEMBLY INCLUDING A COVER HAVING INTEGRAL BAYONETS AND GUARD EARS
7 Claims, 6 Drawing Figs.

[52] U.S. Cl. .................................................. 317/107,
220/40, 317/111, 324/156
[51] Int. Cl. ..................................................... H02b 9/00
[50] Field of Search .......................................... 220/40;
317/104, 105, 107–111; 324/156

[56] References Cited
UNITED STATES PATENTS

| 2,660,330 | 11/1953 | Keller ............................ | 220/40 |
| 2,818,559 | 12/1957 | Manetti ......................... | 220/40 X |
| 2,895,637 | 7/1959 | Bakke ............................ | 317/107 |
| 3,307,081 | 2/1967 | Sloop ............................ | 317/107 |
| 3,371,817 | 3/1968 | Gasbarra ....................... | 220/40 |
| 3,386,611 | 6/1968 | Crute ............................ | 220/40 |
| 3,413,552 | 11/1968 | Daley ............................ | 324/156 |

Primary Examiner—Laramie E. Askin
Assistant Examiner—Gerald P. Tolin
Attorneys—A. T. Stratton and C. L. Freedman ABSTRACT: An enclosure for an electric meter has a cup-shaped glass cover unit. Adjacent its open end the cover unit has spaced lugs or bayonets integral with the remainder of the cover units. A base unit is molded from a phenolic resin material for the purpose of releasably closing the open end of the cup-shaped cover unit. The base unit has a rim adjacent the open end of the cover unit and has clamps or flanges which cooperate with the lugs for the purpose of urging the cover unit towards the base unit in response to relative rotation therebetween. The cover unit also has integral fins which extend into the spaces between the lugs and which project to the periphery of the base unit to assure retention of the cover unit by a conventional sealing ring or mounting cover. Contact blades may pass through the base unit for detachable reception in contact jaws of a conventional meter socket.

Patented Dec. 14, 1971

Patented Dec. 14, 1971

WITNESSES
Theodore F. Wrobel
Leon M. Garman

INVENTORS
Thomas C. Drew, Jr. and
Norbert B. Watts, Jr.
BY C. L. Freedman
ATTORNEY

METER ASSEMBLY INCLUDING A COVER HAVING INTEGRAL BAYONETS AND GUARD EARS

BACKGROUND OF THE INVENTION

1. Field of the Invention

This invention relates to a multipart enclosure suitable for receiving an electroresponsive device. It is particularly suitable for an electric induction watthour meter and will be described as applied to such a meter arranged for detachable reception in a meter socket.

2. Description of the Prior Art

It has been the practice to locate an electric watthour meter within an enclosure formed by a base unit having lugs or bayonets projecting therefrom and a cover unit comprising a glass cup-shaped cover having a metal rim designed for reception of the lugs or bayonets. The handling and stressing incident to the application of the metal rim have resulted in glass breakage. In some cases the stresses applied result in later breakage of the glass.

The metal rim also presents an additional problem of corrosion. Moreover its presence requires care in the type of cleaning to which the cover unit is subjected. Thus the metal rim may prevent the use of caustic cleaning agents and ultrasonic cleaning techniques.

In the copending patent application of Frederich E. Mindt et al., Ser. No. 718,073, filed Apr. 2, 1968, entitled Meter Assembly Having Multipart Gasketed Enclosure, and assigned to the same assignee, the entire cover unit including lugs or bayonets employed in securing the cover unit to the base unit is a homogeneous structure molded from an insulating material such as glass. The base unit is molded from a suitable material, such as a phenolic resin, and includes a rim portion which surrounds and protects the adjacent end of the cover unit. Moreover the base unit includes clamps or flanges which coact with the lugs to secure the units to each other. The lugs terminate short of the periphery of the base unit.

SUMMARY OF THE INVENTION

In accordance with the invention, the base unit of the Mindt et al. patent application is modified to provide spaces separating the clamps or flanges which extend to the periphery of the base unit. The cover unit has integral fins or ears which extend into such spaces to the periphery of the base unit. When a conventional sealing ring is applied over the clamps or flanges, and over the flange of a meter socket, it also embraces the fins or ears to make certain that an unauthorized person cannot separate the various parts.

It is therefore an object of the invention to provide a cover unit with integral bayonets and a base unit which are not subject to unauthorized removal.

BRIEF DESCRIPTION OF THE DRAWINGS

Other objects of the invention will be apparent from the following description taken in conjunction with the accompanying drawings, in which.

DESCRIPTION OF THE PREFERRED EMBODIMENTS

Figure 1:
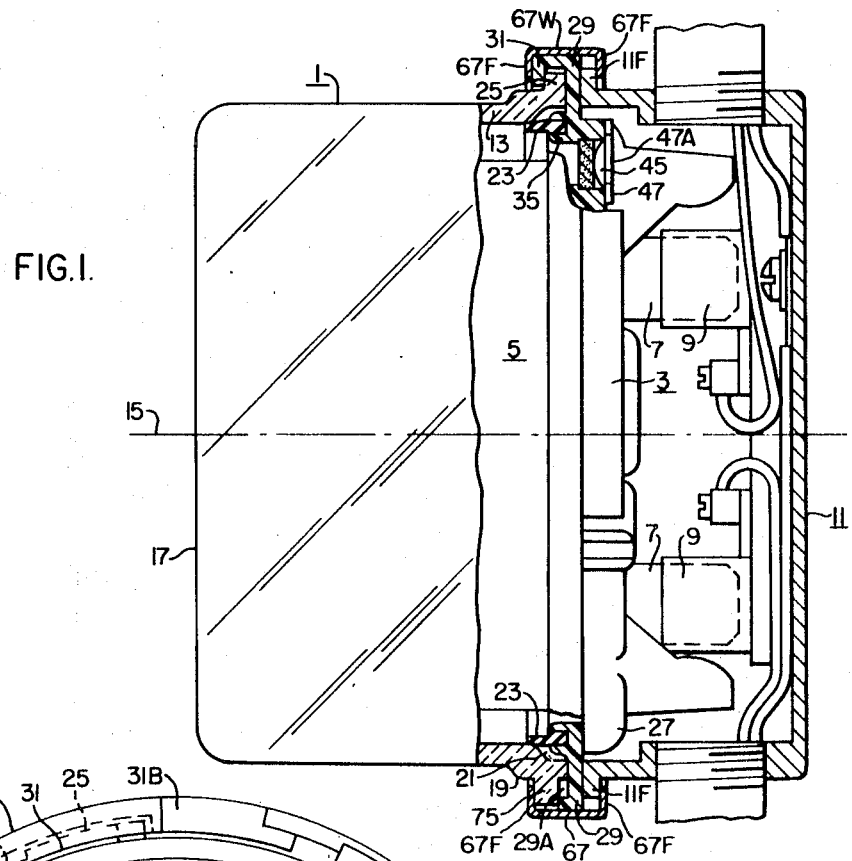
FIG. 1 is a view in side elevation with parts broken away of an electric meter assembly embodying the invention.

Referring to the drawings, FIG. 1 shows a watthour meter assembly wherein a cup-shaped cover unit 1 cooperates with a base unit 3 to define an enclosure within which a watthour meter 5 is located. Several contact blades 7 project from the base unit for the purpose of establishing electrical connections between components of the watthour meter located within the enclosure and an external electric circuit. The contact blades are detachably received by contact jaws 9 located within a conventional cup-shaped socket 11 having a flange 11F extending around the mouth of the socket.

The cover unit 1 has a wall portion 13 which is symmetric about a horizontal axis 15. One end of the wall portion is closed by an end portion 17. Although the wall portion 13 may have a cylindrical surface, preferably this surface is tapered to provide a diameter decreasing towards the end portion 17 for the purpose of facilitating molding of the cover unit.

At its open end the cover unit 1 is provided with a ring 19 having a diameter somewhat larger than that of the wall portion 13. The connection between the ring 19 and the wall portion 13 provides a conical guide surface 21 which is useful for guiding the cover unit over a conical gasket 23 and for centering the cover unit as it is applied to the base unit. The guide surface is spaced from the open end of the cover unit and thus is protected from surfaces on which the cover unit is placed.

Several lugs or bayonets 25 project radially outwardly from the ring 19. In the present embodiment three lugs 25 are employed and are spaced uniformly about the periphery of the ring 19. These lugs are part of a bayonet connection between the cover and base units.

The cover unit preferably is molded as a complete integral homogeneous unit from a light-permeable material which permits reading of a conventional meter register through the end portion 17. Preferably the cover unit is constructed of glass.

The base unit 3 includes a base part 27 which substantially closes the open end of the cover unit 1. The base unit also includes a rim 29. The outer diameter of the base unit is established by standards.

Clamping of the cover unit to the base unit is effected by several flanges or clamps, 31, 31', which are integrally formed on the rim 29. Each clamp 31, 31', overlies a separate one of the lugs 25. Conveniently, the engaging surfaces of the clamp and lug may be so formed or tapered that when the cover unit is rotated in a clockwise direction when viewed towards the right in FIG. 1, the cover unit is forced towards the base part 27. However, such forming or tapering is not essential and may be omitted. Thus the engaging surfaces may be in planes transverse to the axes of the units.

The clamps 31, 31' have angular lengths about the axis 15 which preferably are as small as possible, consistent with being strong enough to resist handling stress.

During a mounting operation of a cover unit 1, the cover unit is moved along its axis and each of its lugs 25 moves through the space between a separate pair of the clamps 31, 31'. The previously mentioned clockwise rotation of the cover unit then introduces a first end 25A of each of the lugs 25 beneath an associated one of the clamps 31, 31'. The end 25A of each of the lugs may have a dimension parallel to the axis 15 which is smaller than the corresponding dimension adjacent the second end of the lug to facilitate introduction of each lug beneath its associated clamp. Adjacent each second end of each of the lugs 25 a recess 33 is provided which cooperates with a sealing device in a manner which will be discussed below. Each recess defines two walls spaced angularly from each other about the axis to block rotation about the axis 15 when a sealing device is located in the recess.

A conventional gasket may be compressed between the edge of the cover unit 1 and the base part 27 in a manner well understood in the art for the purpose of assisting in the sealing of the enclosure formed by the cover and unit. In the embodiment illustrated, a thin-wall conical gasket 23 may be formed of an elastomer material as shown in the aforesaid Mindt et al. application. The large diameter end of the gasket is snugly received in an annular groove 35 which is formed in the base part 27. When the cover unit 1 is applied to the base unit 3 the conical guide surface 21 engages the smaller diameter end of the conical gasket 23 and tends to center the cover unit relative to the base unit. A seat formed by the intersection of the conical guide surface 21 with the inner surface of the wall portion 13 engages the outer surface of the gasket along a circle which is displaced along the slant height of the gasket from the base part 27. This provides an effective seal while permitting ready mounting and removal of the cover unit relative to the base unit.

The gasket may be formed of a suitable elastomer such as a natural or synthetic rubber. Preferably a synthetic rubber such as a butyl rubber is employed. As representative of suitable values, the gasket may have a wall thickness of the order or one-sixth of an inch and may project from the base part for a slant height of the order of one-quarter of an inch.

When the cover unit is being mounted, a lug 25 follows a first path beneath a first end 31A or 31'A of each of the clamps 31, 31'. The second end of each of the clamps is connected to the base part 27 by a ramp or inclined guide surface 31B or 31'B. When the cover unit is being mounted, the ramps 31B and 31'B permit the lugs 25 to move from engagement with the outer surfaces of the clamps 31 gradually towards the base part as the cover unit is rotated until the lugs are positioned for reception beneath the first ends 31A and 31'A of clamps 31, 31'. During removal of the cover unit the ramps permit the lugs to ride up into engagement with the outer 31, 31'of the clamps 31, 31'. To assist in guiding the lugs 25, the rim 29 between the clamps 31, 31' may be provided with shallow arcuate guiding grooves 29A.

Figure 6:
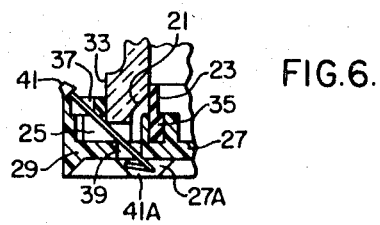
FIG. 6 is a detail view in section showing a sealing device suitable for the assembly of FIG. 1.

In order to seal the cover and base units in mounted position, one of the clamps 31', and the base part 27 are provided with holes 37 and 39, respectively (FIG. 6) for reception of a headed sealing strip or wire 41. These holes are so positioned that the sealing strip or wire has a portion located in the notch or recess 33 of one of the lugs 25. Consequently the lug cannot be moved away from its mounted position without breaking or removing the sealing wire. The unheaded end of the sealing wire may be bent as shown at 41A to prevent removal of the sealing wire until such end is broken off. The material of the sealing wire is so selected that the movement of the end 41A into alignment with the rest of the wire results in breaking off of such end. Such wires are well known in the art. The base part 27 may be provided with an ear 27A on each side of the exposed end of the sealing wire 41 for protective purposes.

Except for the provision of the hole 37, the clamp 31' is similar to the clamps 31.

The base unit preferably is molded as an integral homogeneous structure from an insulating material such as a phenolic resin.

If desired, a conventional sealing ring 67, such as one of the type shown in U.S. Pat. No. 1,969,499, may be employed for sealing the enclosure to the socket 11. This ring has flanges 67F connected by a web 67W. If a ringless socket is employed the socket may have a cover which overlies the lugs 25 and clamps 31, 31' in a conventional manner.

It will be noted that a substantial space separates adjacent pairs of the lugs 25 and a substantial space separates adjacent pairs of the clamps 31, 31'. Because of the spaced lugs and clamps, it may be possible with the construction thus far specifically described to work the meter clear of a conventional sealing ring or of the cover of a conventional ringless socket.

In accordance with an aspect of the invention, the cover unit 1 has guard ears 75 each proportioned to fill substantially the sealing ring space between a separate adjacent pair of the clamps 31, 31' when the meter is in mounted position on the socket, or between a separate adjacent pair of the lugs 25 except for the space X needed for movement of one of the clamps from a position axially displaced from the cover unit to a position wherein the cover may be rotated into clamped position.

Figure 4:
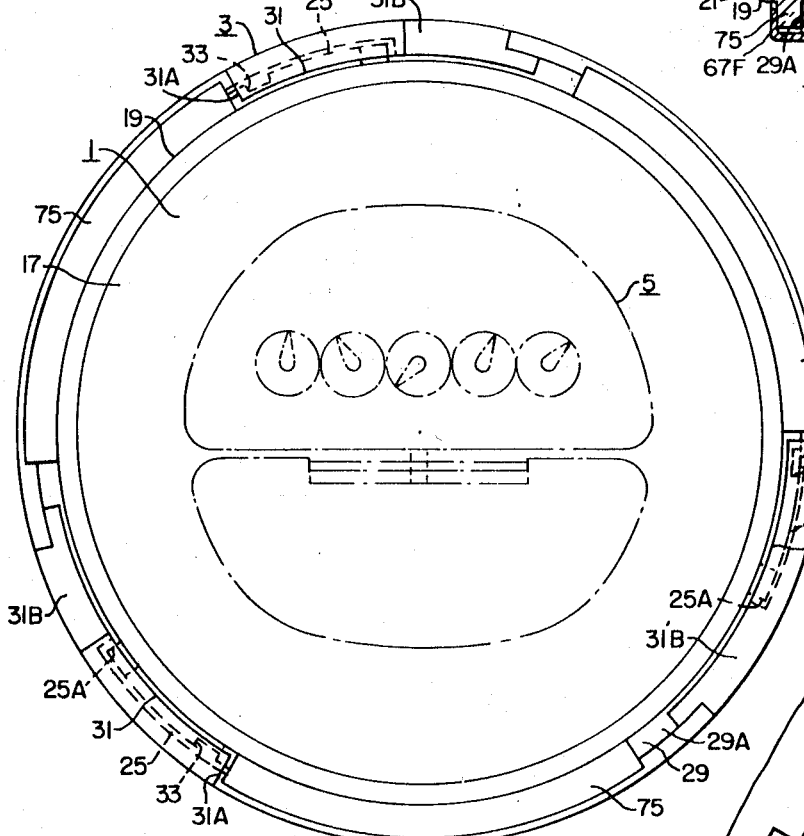
FIG. 4 is a view in front elevation with the sealing ring removed of the assembly shown in FIG. 1.
Figure 5:
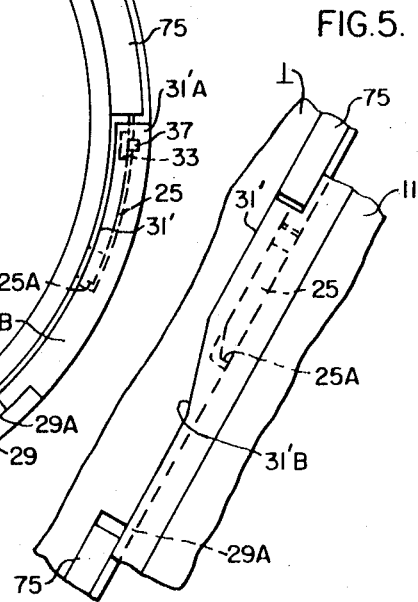
FIG. 5 is a detail view in side elevation of part of the assembly of FIG. 1.

By inspection of FIG. 4 it will be noted that the outer radius of each of the ears 75 is only slightly less than the outer radius of the base unit 3. Thus if the cover is rotated in a counter-clockwise direction to remove it from clamped position on the base unit while the sealing ring is in sealing position, the leading edge of each ear 75 rides up the associated ramp 31B or 31'B before the smaller cover lugs 25 have cleared their associated clamps. This forces the ears against the sealing ring to prevent an unauthorized person from working one lug at a time free of the sealing ring.

By reference to the upper part of FIG. 1 it will be noted that the socket flange 11F and the clamp 31 extend snugly between the flanges 67F of the sealing ring 67.

A clamp 31 or 31' does not appear in the lower part of FIG. 1. However, the ear 75, the rim 29 and the socket flange 11F extend substantially between the flanges 67F and extend very close to the web 67W connecting the flanges.

The clamps 31 or 31', the ears 75 and the flange 11F fix the position of such a large percentage of the sealing ring that an unauthorized person cannot work the meter free from the sealing ring while the latter is in sealing condition.

Figure 2:
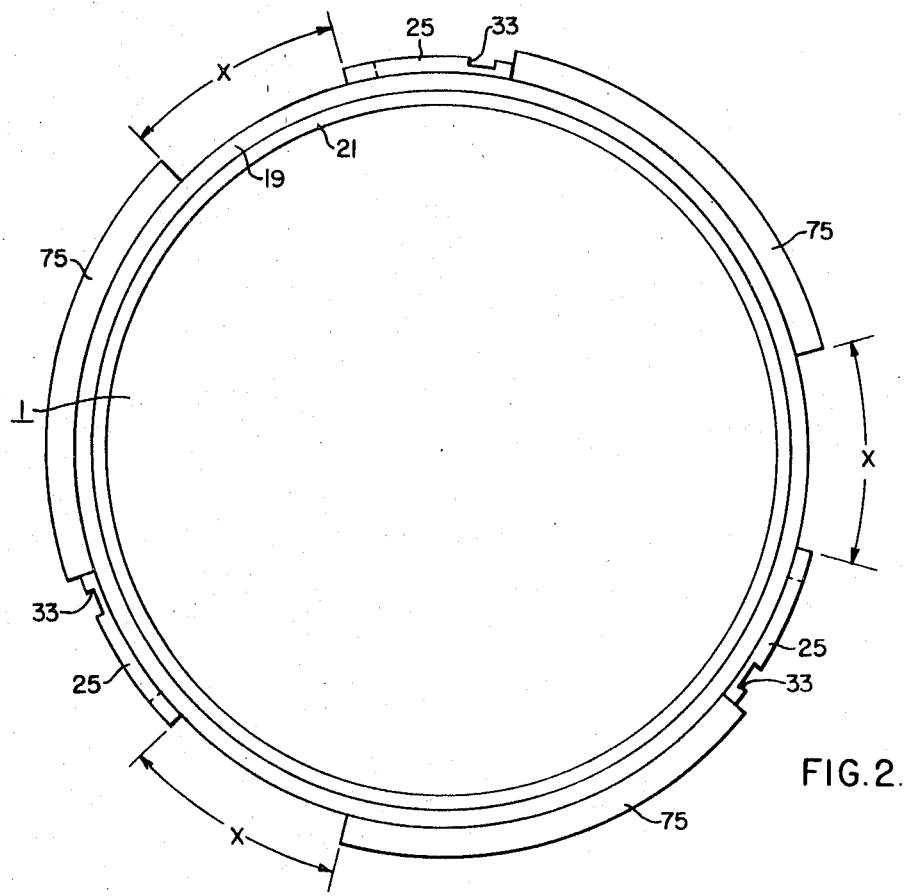
FIG. 2 is a view in rear elevation of a glass cover employed in the assembly of FIG. 1.

By inspection of FIG. 2 it will be noted that the ears 75 have a maximum radial dimension substantially larger than that of the lugs 25. This enables the ears 75 to extend into abutting engagement, or almost into abutting engagement with, the web 67W of the sealing ring when the sealing ring is in mounted position.

Figure 3:
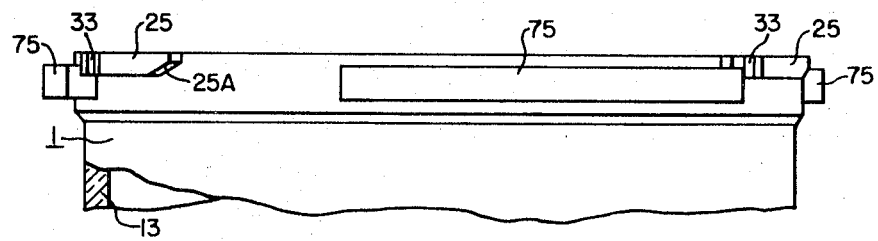
FIG. 3 is a view in side elevation with parts broken away of the glass cover unit shown in FIG. 2.

As shown in FIG. 3 the ears 75 are spaced slightly below the open end of the cover unit. Thus the ears do not interfere with the sealing of the cover unit on the base unit. It will be noted that the lugs 25 and ears 75 are arranged in pairs, each pair having an ear and a lug in effect projecting from one end of the ear.

In mounting the cover unit on the base unit and the resultant assembly on the socket, the base unit 3 is moved along the axis 15 towards the cover unit 1 with the units angularly oriented to introduce the clamps 31, 31' through the spaces X. The base unit 3 is then angularly rotated clockwise relative to the cover unit 1, to introduce the thin ends 25A of the lugs 25 into the clamps 31 and 31'. At this time the free ends of the ears 25 are in engagement with the associated ramps 31B, 31'B. Upon continued relative rotation the ears ride down the ramps to permit entry of the thicker parts of the ends 25A into the associated clamps until the cover and base units are fully clamped together. The sealing wire 41 next is applied in the manner previously discussed.

The resultant assembly is moved along the axis 15 in proper orientation for the contact blades 7 to be forced into the appropriate contact jaws 9 until the base unit 3 is against the flange 11F of the socket. The sealing ring 11 finally is applied in a manner which is clear from the aforesaid U.S. Pat. No. 1,969,499.

By following a reverse procedure the parts may be disassembled.

It should be noted that the cover unit 1 is constructed entirely of a material such as glass. Inasmuch as it includes no metal parts, breakage of cover units is minimized and a substantially lower cost results. The cover unit includes no part subject to corrosion. The more effective cleaning techniques may be employed including ultrasonic techniques and caustic solutions which might affect metallic parts.

The cover and base units both are constructed of insulating materials. Consequently if parts of these units touch the contact jaws or other electrical components during mounting or removal of the units, no short circuiting of such electrical parts can occur.

We claim as our invention:

1. An enclosure for an electroresponsive device comprising a unitary nonmetallic cover unit, said cover unit including a cup-shaped section having a wall portion symmetric about an axis, an end portion closing one end of the wall portion, a plurality of integral, circumferentially spaced lugs projecting radially outwardly from said wall portion adjacent the open end of the cup-shaped section, an integral, separate guard ear projecting outwardly from said wall portion intermediate each adjacent pair of said lugs, said lugs and guard ears being arranged in pairs, with each pair comprising a guard ear and a lug extending away from the associated guard ear in a first direction angularly about the axis, said pairs being spaced from each other, a base unit, said base unit having an end part substantially closing the open end of the cup-shaped section, with said end part including a rim and a plurality of clamps carried by the rim, each of said clamps receiving a separate one of the lugs of the cover unit between the clamp and the rim, said clamps and lugs having mating surfaces which overlap in locking relationship which is releasable in response to relative rotation therebetween in a predetermined direction, each of said clamps being proportioned for movement through the space between adjacent ones of said pairs to permit removal of said cover unit from said base unit, a watthour meter located within the enclosure formed by said cover and base units, a plurality of contact blades projecting exteriorly from the base unit to establish connections between the meter and an external circuit, a socket having a plurality of contact jaws releasably engaging the contact blades, said socket having a flanged opening closed by said base unit, and a sealing ring having a web and flanges defining a substantially U-shaped cross section, said sealing ring being disposed to maintain the assembled relation of the cover, base and socket, and prevent removal of the cover unit by working one lug at a time free from said sealing ring, by snugly enclosing the clamps, lugs, rim and socket flange between its flanges at predetermined circumferentially spaced locations, and by snugly enclosing the guard ears, rim and socket flange between its flanges in the spaces between the circumferentially spaced cooperative clamps and lugs.

2. The enclosure of claim 1 wherein each of the lugs has a dimension parallel to the axis of the cup-shaped section which increases from a first dimension at a first end to a larger dimension in a first direction arcuately about the axis.

3. The enclosure of claim 1 wherein each of the lugs has a separate recess bordered by two walls spaced from each other angularly about the axis.

4. The enclosure of claim 1 wherein each of the guard ears has a maximum radial dimension measured from said axis which is larger than that of the lugs, each of the lugs being substantially an arcuate extension about the axis of one end of the associated one of the guard ears.

5. The enclosure of claim 1 wherein each of the clamps has at one end a ramp which forms an inclined path leading from the surface of the clamp remote from the end part towards the end part to permit gradual approach of the cover section toward the end part in response to relative rotation of the cover unit and the end part in the predetermined direction.

6. The enclosure of claim 1 wherein the cover unit is constructed unitarily and homogeneously of light-permeable insulating material and the base unit is constructed of insulating material.

7. The enclosure of claim 1 wherein the guard ears have a maximum radial dimension measured from the axis of the cup-shaped section which is larger than that of the lugs, and the clamps have a maximum radial dimension substantially equal to that of the guard ears.

* * * * *